UNITED STATES PATENT OFFICE.

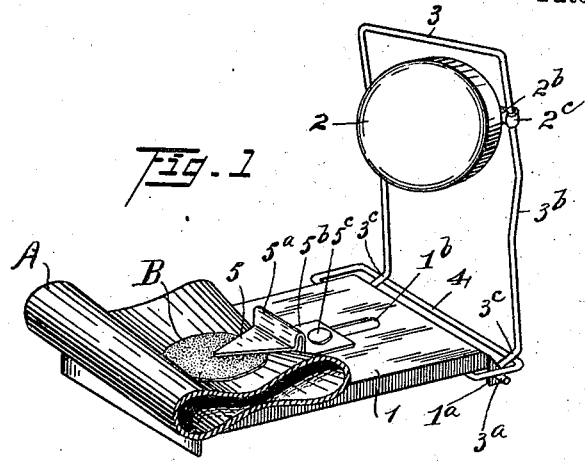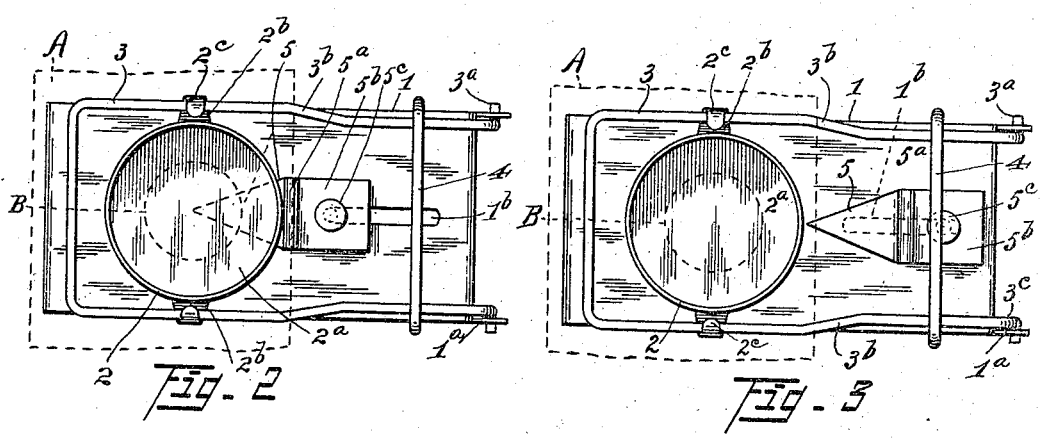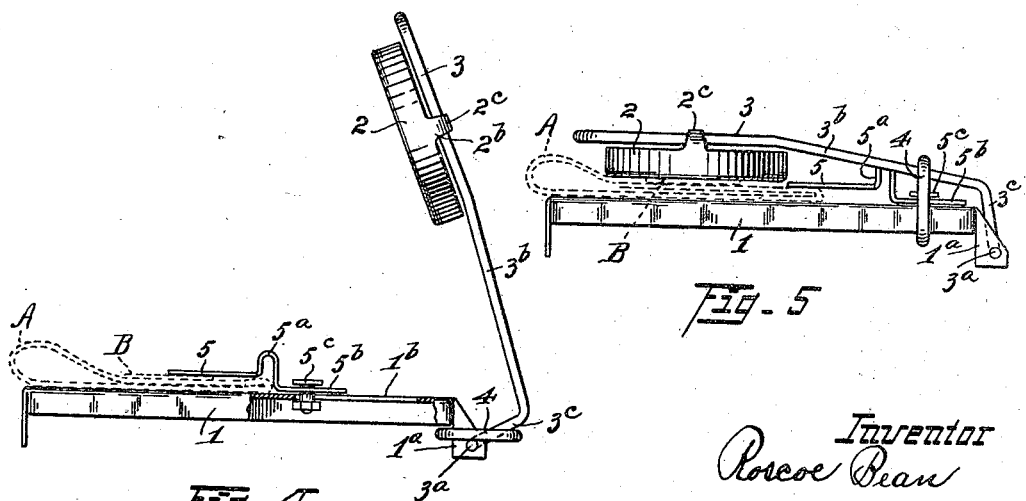

ROSCOE BEAN, OF BEREA, OHIO.

VULCANIZING DEVICE.

1,250,771.  Specification of Letters Patent.  Patented Dec. 18, 1917.

Application filed January 10, 1917. Serial No. 141,572.

*To all whom it may concern:*

Be it known that I, ROSCOE BEAN, a citizen of the United States, residing at Berea, in the county of Cuyahoga and State of Ohio, have invented certain new and useful Improvements in Vulcanizing Devices, of which the following is a specification.

My invention relates to improvements in vulcanizing devices, and more particularly to that class or type known as "portable vulcanizing devices" and is particularly designed and adapted for use in the application and vulcanization of patches in the repair of rubber articles, particularly such as pneumatic tires, inner tubes for such tires, and the like.

The primary object of the invention is the provision of a generally improved vulcanizing device of this class which will be exceedingly simple in construction, cheap of manufacture, and efficient in use.

A further object is the provision of means for temporarily supporting and centralizing the puncture or part in the article to be mended together with the superposed patch or vulcanizable material, as well as holding the same in such centralized position and enabling the vulcanizer or heat transmitting element to be later disposed centrally thereover preparatory to the clamping and vulcanizing operation.

A still further object is the provision of improved means of mounting and adjusting the vulcanizer or receptacle for the heat generating element, together with an improved adjustably mounted clamp, whereby the various parts may be readily adjusted and centralized to receive and conform to rubber articles of varying forms and dimensions thereby adapting the device to a wide range of use.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings forming a part of this specification, Figure 1, is a perspective view of a device constructed in accordance with this invention, the improved patchholding and centralizing device being shown in position preparatory to the closing down and the centralizing thereover of the vulcanizer member or heat transmitting element preparatory to the vulcanizing operation.

Fig. 2, a top plan view of the same with the vulcanizer member closed and centralized over the patchholding and centralizing devices preparatory to the removal of the latter from between the parts and clamping for the vulcanizing operation.

Fig. 3, a similar view, showing the initial patchholding and centralizing device removed from between the parts preparatory to clamping and vulcanizing.

Fig. 4, a side elevation of the same, (partly in section) showing the vulcanizer member or heat transmitting element in its open or elevated position preparatory to the reception and positioning of the article and patch to be vulcanized.

Fig. 5, a side elevation of the same in closed and clamped position ready for the vulcanizing operation.

Similar numerals of reference designate like parts throughout all the figures of the drawings.

The improved vulcanizing device comprises a base or support 1, the forward end of which is adapted to form a support or table for supporting the article to be mended during the vulcanizing operation.

The vulcanizer or heat transmitting element 2, may be of any suitable and convenient form, and, in the present instance, is in the form of a metallic disk provided with a rim portion forming a receptacle $2^a$, to receive and contain the combustible or heat producing element of any suitable and convenient form.

As a means of properly supporting and adjusting the vulcanizer 2, in its respective open and closed positions, the vulcanizer 2, is adjustably mounted on and carried by an arm or lever member 3, pivotally connected to the base or support 1, said movable arm or lever arm 3, in the present instance, comprising a bail or loop member formed of a single length of wire forming spring side arms terminating in hinge lugs $3^a$, operating in suitable openings in hinge members $1^a$, at the rear or end of the base of the support 1. The side members 3, of the bail or loop member are preferably provided with inclined portions $3^b$, and stop members $3^c$, for coöperating with the clamping device 4, consisting, in the present instance, of an elongated loop or sleeve slidably mounted beneath the base or support 1, and adapted to be moved forwardly over and in clamping relation to the inclined portions 3$^b$, of the bail or loop member in the clamping operation as suggested in Fig. 5, of the drawings.

As a means of limiting the rearward movement of the vulcanizer carrying arm or lever 3, and stopping the latter in its elevated position, the loop or ring member 4, is adapted when moved rearwardly to rest upon the hinge lugs 3$^a$, and to abut against the stop members 3$^c$, as shown in Figs. 1, and 4, of the drawings.

As a means of adjusting the vulcanizer or heat transmitting element 2, longitudinally and relative to the article and patch to be clamped and vulcanized and enabling the vulcanizer 2, to be adjusted and centralized to conform to the dimensions and location of the article and patch while being held by the improved holding and centralizing device hereinafter described, the vulcanizer 2, is slidably mounted on the side arms 3, of the lever member, in the present instance, by means of supporting lugs 2$^b$, terminating in guide loops 2$^c$, the latter surrounding the adjacent sides of the bail or loop member in frictional engagement therewith and being adapted to be adjusted thereon in an obvious manner.

As a means of temporarily supporting and centralizing the puncture or part in the article to be mended, as for example,—an inner tube A, together with a superposed patch B, as well as holding the same in such position and enabling the vulcanizer 2, to be disposed centrally thereon preparatory to the clamping and vulcanizing operation, a temporary article and patchholding device 5, is provided, said device, in the present instance, consisting of a member comprising an indicating and holding tongue 5, terminating at its base in an upstanding looped portion 5$^a$, and a supporting slide or attaching shank 5$^b$, and as a convenient means of moving the article and patchholding device into and out of its respective operative and inoperative positions as indicated in Figs. 2, and 3, of the drawings, respectively, the shank 5$^b$, is slidably mounted and connected to the base or support 1, by means of a clamping screw or bolt 5$^c$, extending through and operating within a guide slot 1$^b$, in the base or support 1, and it will be observed upon reference to Figs. 4, and 5, of the drawings that the indicating or holding tongue 5, is offset or elevated above the plane of the shank portion 5$^b$, a distance corresponding substantially to the thickness of the article A and patch B to be held, and it will also be observed that the upstanding portion 5$^a$, is adapted to clear the edge of the vulcanizer 2, when the latter is placed down upon the patch B, as indicated in Fig. 2, of the drawings, so that the vulcanizer or heat transmitting element 2, will be necessarily centralized with respect to the patch B, and the puncture or part in the article to be repaired, after which the indicating or holding device 5, may be slipped to the rear and from between the parts to the position indicated in Fig. 3, of the drawings, and the clamping ring 4, may then be moved forwardly in coöperative relation to the inclined portions 3$^b$, thereby clamping the vulcanizer 2, down upon the patch and article to be vulcanized in the well known and understood vulcanizing operation.

From the foregoing description, taken in connection with the accompanying drawings, the operation and advantages of my invention will be readily understood.

Having thus described one of the embodiments of my invention, what I claim and desire to secure by Letters Patent, is,—

1. In a vulcanizing device, a temporary article and patch centralizing device.

2. In a vulcanizing device, a preliminary patch and vulcanizer centralizing device.

3. A vulcanizing device, comprising a support, a vulcanizer, a clamping device, and a holding and centralizing device.

4. In combination with a support and a vulcanizer, a centralizing member in coöperative relation therewith.

5. In a vulcanizing device, including a supporting member and a pivotally connected overhanging vulcanizer member, a preliminary patch and vulcanizer centralizing device in coöperative relation to said members.

6. In a vulcanizing device, comprising a support, an overhanging lever member carrying a longitudinally adjustable vulcanizer, and longitudinally adjustable clamp and patch centralizing members in coöperative relation therewith.

7. In a vulcanizing device, a support carrying a vertically movable longitudinally adjustable vulcanizer, and longitudinally adjustable clamp and patch centralizing members in coöperative relation therewith.

8. A vulcanizing device, comprising a support, a lever member mounted thereon, a vulcanizer carried by said lever member, and a clamp sleeve inclosing said support and lever member and longitudinally adjustable thereon.

9. A vulcanizing device, comprising a support, a lever member mounted thereon, a vulcanizer carried by said lever member, and a clamp sleeve inclosing said support and lever member and longitudinally adjustable thereon and adapted to open and close the latter.

10. In a vulcanizing device, the combination with a support, and a pivotally mounted longitudinally adjustable vulcanizer thereon; of a preliminary patch and vulcanizer centralizing device longitudinally movable on said support in coöperative relation to said vulcanizer.

11. In a vulcanizing device, the combination with a support, and a pivotally mounted longitudinally adjustable vulcanizer thereon; of a preliminary patch and vulcanizer centralizing device longitudinally movable on said support in coöperative relation to the latter and said vulcanizer.

12. A vulcanizing device, comprising a supporting member, an overhanging bail member pivotally mounted thereon, a vulcanizer member carried by said bail member, and a clamping sleeve member slidably and adjustably mounted on said supporting and bail members and adapted to open and close the latter.

13. A vulcanizing device, comprising a supporting member, an overhanging U-shaped bail member pivotally mounted thereon, a vulcanizer member carried by and within said U-shaped bail member, and a clamping sleeve member slidably and adjustably connecting said supporting and bail members and adapted to open and close the latter.

14. A vulcanizing device comprising a supporting base member, a loop member having its sides provided with inclined portions and terminating in hinge lugs connected to one end of said supporting base member, a vulcanizer element carried by and longitudinally adjustable on the sides of said loop member, and a clamping loop slidably and adjustably mounted on said supporting base and loop members in coöperative relation to the inclined portions of the latter and adapted to support said loop member in an open position.

15. A vulcanizing device comprising a supporting base member, a U-shaped loop member having its sides provided with inclined portions extending at a wedge-shaped angle to said base members and terminating in hinge lugs detachably connected to one end of the latter, a vulcanizer element carried by and longitudinally adjustable within the sides of said U-shaped loop member, and an elongated clamping ring slidably and adjustably mounted on said supporting base, and loop member in coöperative relation to the wedge-shaped angle portions of the latter.

16. A vulcanizing device, comprising a support, an overhanging lever thereon including spring side arms, a vulcanizer member horizontally movable beneath and arranged within said spring side arms, and means for detachably connecting said support and spring side arms whereby the latter and said vulcanizer are resiliently drawn against and clamped upon said supporting member.

17. A vulcanizing device, comprising a support, a U-shaped spring lever thereon, a vulcanizer interposed therebetween, and detachable connecting means between said lever and support and extending under and operable beneath the latter for drawing and clamping said lever and vulcanizer against said support.

18. A vulcanizing device, comprising a support provided with hinge members, an overhanging lever member having spring side arms terminating in pivot members carried by said hinge members, a vulcanizer member arranged within and engaged by said spring side arms, and means for detachably connecting said spring side arms to said support whereby said vulcanizer is resiliently drawn against and clamped upon said support through said spring arms.

19. A vulcanizer device, comprising a support, overhanging adjustable spring arms mounted thereon, a vulcanizer movably interposed therebetween and controlled by said spring arms, and means for detachably connecting said support and spring arms whereby the latter and said vulcanizer are resiliently drawn toward said support and are permitted to conform to and equalize the pressure upon the interposed article to be vulcanized.

20. A vulcanizing device, comprising a support, and an overhanging pivoted lever member normally extending at a wedge-shaped diverging angle from the pivoted portion thereof and relative to said support, a vulcanizer adapted to be clamped between said support and lever member, and a variable clamp sleeve movable on said support and lever member and over and against said wedge-shaped diverging angle and toward said vulcanizer whereby to vary the pressure on the latter.

21. A vulcanizing device, comprising a support, and an overhanging pivoted lever member extending at a wedge-shaped incline from the pivoted portion thereof and relative to said support, a vulcanizer adjustable between and clamped by said support and lever member, and a variable clamp sleeve movable on said support and lever member and over said wedge-shaped incline toward said vulcanizer whereby to vary the pressure of the latter.

22. A vulcanizing device, comprising a supporting base member, an overhanging loop member having its sides provided with inclined portions extending at an angle to said base member and terminating in pivot connections on the latter, a vulcanizer interposed between said base member and the sides of said loop member, and a clamping sleeve slidably inclosing said base and loop members in coöperative relation to said inclined portions and movable thereon whereby to vary the pressure on said vulcanizer.

23. A vulcanizing device, comprising a supporting base member, an overhanging loop member having its sides provided with inclined portions extending at an angle to said base member and pivotally connected at one end of the latter, a vulcanizer interposed between said base member and the sides of said loop member, and a clamping sleeve slidably inclosing said base and loop members in coöperative relation to said inclined portions and movable thereon whereby to vary the pressure on said vulcanizer.

24. A vulcanizing device, comprising a supporting member, an overhanging U-shaped bail member thereon, a vulcanizer member interposed between said supporting and bail members, one of said members being resilient, and a clamping device connected to said supporting member and detachably connecting said bail member whereby the latter and said vulcanizer are resiliently drawn against and clamped upon said supporting member.

25. A vulcanizing device, comprising a supporting member, a spring member pivotally connected to said supporting member, a vulcanizer member interposed between said spring member and said supporting member, and non-yielding means for detachably connecting said supporting and spring members whereby said vulcanizer member is resiliently drawn against said supporting member and is adapted to conform to and equalize its pressure upon the interposed article to be vulcanized.

26. A vulcanizing device, comprising a support, an overhanging U-shaped bail member pivotally mounted thereon, a vulcanizer member interposed between said supporting and bail members and arranged within the latter, and a clamping device detachably connecting said supporting and bail members whereby said vulcanizer member is drawn against and clamped upon said supporting member.

27. In a vulcanizing device, a support, overhanging spaced spring arms carried thereby, a vulcanizer member interposed between said support and spring arms and arranged within the latter, and means for opening and closing said spring arms and placing a tension on said vulcanizer member through said spring arms whereby to permit the same to conform to and equalize the pressure upon the article being vulcanized between said support and vulcanizer.

In testimony whereof I have affixed my signature in the presence of two witnesses.

ROSCOE BEAN.

Witnesses:
JAS. B. OSWALD,
O. C. BILLMAN.

Copies of this patent may be obtained for five cents each, by addressing the "Commissioner of Patents, Washington, D. C."